(12) United States Patent
Tojo et al.

(10) Patent No.: US 7,048,975 B1
(45) Date of Patent: May 23, 2006

(54) PULP MOLDED CONTAINER

(75) Inventors: Takehiko Tojo, Tochigi (JP); Yoshiaki Kumamoto, Tochigi (JP); Masataka Ishikawa, Tochigi (JP); Kunio Matsui, Tochigi (JP); Eiki Kimura, Tochigi (JP); Koichi Sagara, Tochigi (JP); Kenichi Otani, Tochigi (JP); Shingo Odajima, Tochigi (JP); Tokihito Sono, Tochigi (JP)

(73) Assignee: Kao Corporation, Tokyo (JP)

( * ) Notice: Subject to any disclaimer, the term of this patent is extended or adjusted under 35 U.S.C. 154(b) by 520 days.

(21) Appl. No.: 10/110,715

(22) PCT Filed: Oct. 2, 2000

(86) PCT No.: PCT/JP00/06818

§ 371 (c)(1),
(2), (4) Date: Aug. 6, 2002

(87) PCT Pub. No.: WO01/26978

PCT Pub. Date: Apr. 19, 2001

(30) Foreign Application Priority Data

Oct. 15, 1999 (JP) .......................................... 11/293706
Oct. 2, 2000 (JP) ...................................... 2000-034024

(51) Int. Cl.
*B29D 20/00* (2006.01)
*B29D 23/00* (2006.01)
*B32B 1/08* (2006.01)

(52) U.S. Cl. .................... 428/34.3; 428/35.6; 428/36.4; 428/36.5; 428/36.7; 428/213; 428/220; 428/304.4; 428/333; 428/537.5

(58) Field of Classification Search ............... 428/34.2, 428/35.6, 36.4, 36.9, 36.91, 213, 215, 332, 428/334, 335, 336, 337, 339, 532, 537.5, 428/34.3, 36.5, 36.6, 36.7, 220, 304.4, 333, 428/535; 162/218, 231
See application file for complete search history.

(56) References Cited

U.S. PATENT DOCUMENTS 2,732,119 A * 1/1956 Risch .......................... 229/406
2,961,043 A 11/1960 Hicks
4,132,591 A * 1/1979 Merges, Jr. .................. 162/146
4,337,116 A * 6/1982 Foster et al. ................. 162/158

FOREIGN PATENT DOCUMENTS

| JP | 35-9669 | 7/1960 |
|---|---|---|
| JP | 47-20404 | 9/1972 |
| JP | 47020404 A * | 9/1972 |
| JP | 48-4175 | 1/1973 |
| JP | 51-137571 | 11/1976 |
| JP | 51-139838 | 12/1976 |
| JP | 55-166232 | 12/1980 |
| JP | 56-34452 | 4/1981 |
| JP | 5-25796 | 2/1993 |
| JP | 6-278160 | 10/1994 |
| JP | 9-111693 | 4/1997 |
| JP | 10-501783 | 2/1998 |
| JP | 6-7039 | 1/1999 |
| WO | WO 98/06636 | 2/1998 |

* cited by examiner

*Primary Examiner*—Michael C. Miggins
(74) *Attorney, Agent, or Firm*—Oblon, Spivak, McClelland, Maier & Neustadt, P.C.

(57) ABSTRACT

A pulp molded container comprising a pulp molded article (2) having on the inner surface and/or the outer surface thereof a resin layer (3) with a thickness of 5 to 300 μm formed by applying a coating, wherein the thickness ratio of the resin layer (3) to the molded article (2) (former/latter) is 1/2 to 1/100, and the surface roughness profile of the outer or inner surface of the pulp molded article is such that a centerline average roughness (Ra) is 0.5 to 20 μm.

8 Claims, 9 Drawing Sheets

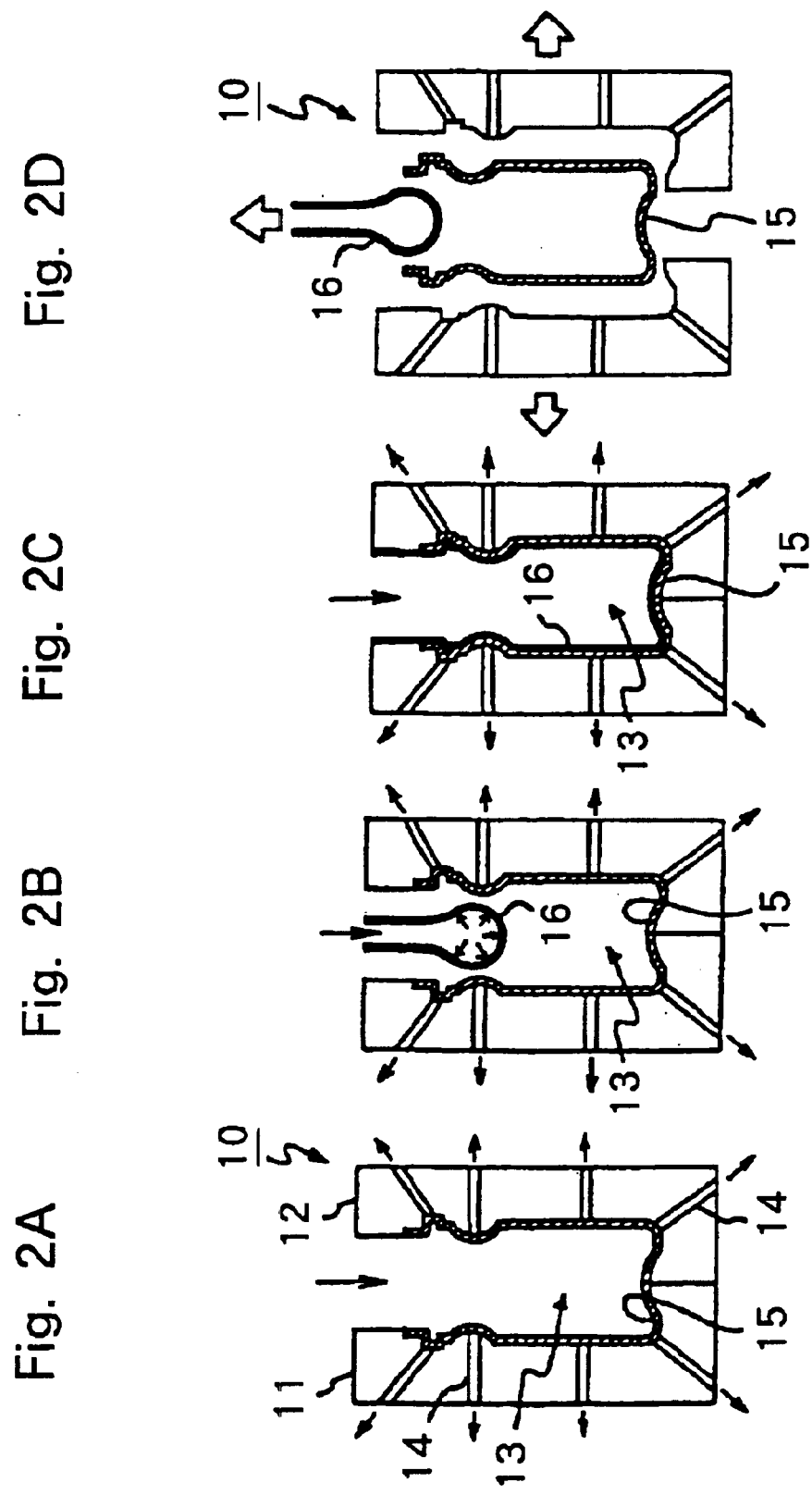

PULP MOLDED CONTAINER

TECHNICAL FIELD

The present invention relates to a pulp molded container. Particularly, it relates to a pulp molded container comprising a pulp molded article having a resin layer formed on the inner or outer surface thereof More particularly, it relates to a pulp molded container which achieves waterproofness and moistureproofness with a smaller amount of raw material than conventionally required, exhibits high barrier properties against gas or liquid, and is prevented from developing blisters between the molded article and the resin layer.

BACKGROUND ART

Known techniques regarding containers comprising a pulp molded article having a resin layer provided thereon include, for example, the one disclosed in JP-A-10-46500. The publication discloses a method of obtaining a shallow molded tray comprising spraying an aqueous polymer solution onto the inner side of a pulp layer with a prescribed water content either before dewatering or after room-temperature dewatering and drying the pulp layer by means of a hot press, etc.

According to this method, however, because the sprayed aqueous polymer solution penetrates into the pulp layer, a large quantity of the aqueous polymer solution is required to form a layer of sufficient thickness for manifesting waterproofness and moistureproofness, and a long drying time is needed, resulting in an increased production cost. Besides, the aqueous polymer solution having penetrated into the pulp layer acts as a binder for pulp fibers to impair disintegrability of pulp fibers, which makes recycling difficult.

Where a thick resin layer is formed on both the inner and the outer surfaces of a pulp molded article in an attempt to enhance barrier properties against gas or liquid, blisters develop between the molded article and the resin layers, resulting in not only reduced barrier properties but impaired appearance. Blisters are a phenomenon that, where a coating is applied to one side of a molded article previously having a resin layer provided on the other side, the solvent volatilizing from the coating on drying is unable to find the way out, causing the resin layer to lift from the molded article surface.

Additionally, where a thick resin layer is formed through a single coating operation, the applied coating sags or runs, resulting in non-uniformity of various properties of the resin layer after drying. It is conceivable to repeatedly applying a coating thinly to obtain desired performance, but such involves an increased number of production steps, which reduces production efficiency and is economically disadvantageous.

Another technique known for improving performance of a pulp molded article is providing a part of a pulp molded article with a molded piece made of a synthetic resin. For example, JP-A-6-278160 teaches injection molding the same resinous component as used in a pulp molded article into a molded piece integral with the pulp molded article. According to the technique disclosed, since the molded piece and the molded article are integral with each other, it is bard to separate them before putting out for separated garbage collection. In order to exclude necessity of separation, it is desirable to make up a product solely of a pulp molded article without using such a molded piece of different material. In this case, however, particularly for use as a container with lid or cap, shape precision necessary for assuring a desired tight fit or durability withstanding repeated use would not be sufficiently secured.

DISCLOSURE OF THE INVENTION

Accordingly, an object of the present invention is to provide a pulp molded container which achieves waterproofness and moistureproofness with a smaller amount of raw material than conventionally required and is easily recyclable.

Another object of the present invention is to provide a pulp molded container which assures storage stability of the contents and has a satisfactory appearance.

Still another object of the present invention is to provide a pulp molded container which exhibits high barrier properties against gas or liquid and is free from blister development between a molded article and a resin layer.

Yet another object of the present invention is to provide a pulp molded container having a resin layer which manifests desired performance uniformly.

An additional object of the present invention is to provide a pulp molded container which can be discarded as such without causing environmental pollution or, if necessary, can be separated with ease, and ensures a tight fit and durability withstanding repeated use.

The present invention accomplishes the above objects by providing a pulp molded container comprising a pulp molded article having a resin layer with a thickness of 5 to 300 μm made of a synthetic resin and formed on the inner surface and/or the outer surface thereof the thickness ratio of the moistureproof layer to the molded article (former/latter) being 1/2 to 1/100.

BRIEF DESCRIPTION OF THE DRAWINGS

FIG. 2A, FIG. 2B, FIG. 2C and FIG. 2D schematically represent a sequence of the papermaking step out of the steps involved for the production of a pulp molded article of a pulp molded container.

FIG. 4A, FIG. 4B, FIG. 4C and FIG. 4D illustrate the step of forming a resin layer on the inner surface of a pulp molded article, in which FIG. 4A shows a nozzle head of a spraying apparatus before being inserted into a pulp molded article; FIG. 4B the nozzle head inserted and spraying a coating to the inner surface of the pulp molded article; FIG. 4C the nozzle head inserted and spraying the coating to the inner bottom surface of the pulp molded article; and FIG. 4D the resin layer being dried.

FIG. 5A, FIG. 5B and FIG. 5C schematically illustrate the step of forming a resin layer on the outer surface of a pulp molded article, wherein FIG. 5A shows a nozzle head of a spraying apparatus spraying a coating onto the outer surface of the pulp molded article; FIG. 5B the nozzle head spraying the coating on the outer bottom surface of the pulp molded article; and FIG. 5C the resin layer being dried.

FIG. 6A, FIG. 6B and FIG. 6C schematically depict the step of forming a resin layer on the inner surface of a pulp molded article, in which FIG. 6A shows a coating being poured into a bottle through an injection nozzle; FIG. 6B the injection nozzle withdrawn from the bottle; and FIG. 6C the coating being discharged from the bottle.

FIG. 7A and FIG. 7B are schematic illustrations of the step of forming a resin layer on the outer surface of a pulp molded article, wherein FIG. 7A shows a bottle dipped in a coating in a tank, and FIG. 7B an excess coating being removed.

THE BEST MODE FOR CARRYING OUT THE INVENTION

Figure 1A:
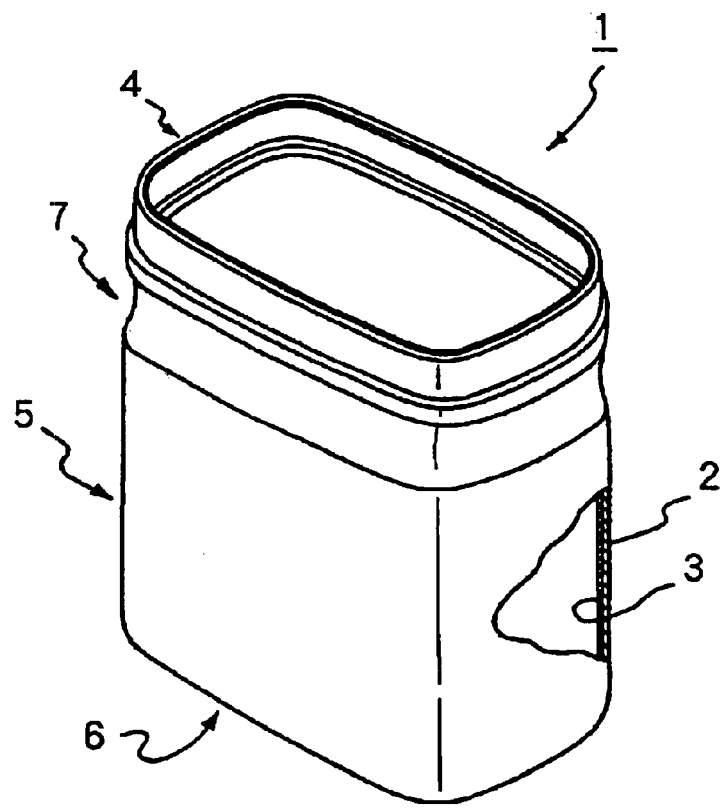
FIG. 1A is a perspective of a pulp molded container according to an embodiment of the present invention, with a part cut away.
Figure 1B:
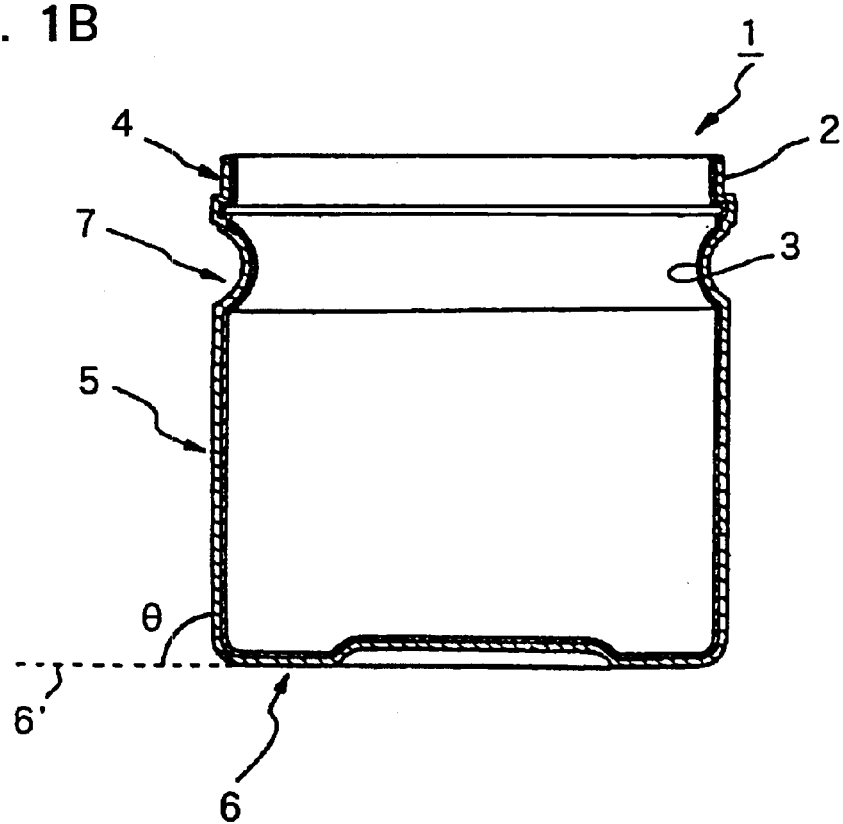
FIG. 1B is a vertical cross-section of FIG. 1A.

The pulp molded container of the present invention will be described below based on its preferred embodiments with reference to the accompanying drawings. FIG. 1A is a perspective view of a pulp molded container (hereinafter sometimes simply referred to as a container) according to the first embodiment of the present invention, with a part cut away. FIG. 1B is a vertical cross-section of FIG. 1A.

The pulp molded container 1 according to this embodiment is a pulp molded article (hereinafter sometimes simply referred to as a molded article) 2 having a resin layer 3 on the entire inner surface thereof (the side for keeping the contents). It has an opening portion 4 at the top, a body 5, and a bottom 6. The body 5 has a recess 7 continuous around the whole circumference thereof. The container 1 is used as a hollow container fit for keeping such contents as powders, granules, liquids, and the like.

The container 1 seen from its side, the outer surfaces (exclusive of the recess 7) of the front and rear walls forming the body 5 are straight in the direction of height. Similarly when the container 1 is seen from the front, the outer surfaces (exclusive of the recess 7) of the left and right side walls forming the body 5 are straight in the direction of height. Every wall, front, rear, right and left, stands upright making an angle θ of approximately 90° with the plane of contact 6' of the bottom 6.

The thickness of the resin layer 3 is 5 to 300 μm, preferably 10 to 300 μm, still preferably 20 to 150 μm. A resin layer thinner than 5 μm fails to exhibit sufficient waterproofness and moistureproofness for achieving storage stability of the contents. A resin layer 3 thicker than 300 μm requires much time for drying, and application of such a thick coat causes sags and runs, resulting in problems such as uneven thickness of the resin layer 3. The thickness of the resin layer 3 is measured through microscopic observation of the cut area of the container 1. Unlike the molded tray described in JP-A-10-46500 supra, the container 1 according to the present embodiment shows clear distinction between a pulp fiber region making up the molded article 2 and a synthetic resin region constituting the resin layer 3. That is, the molded tray described in that publication does not have a clear boundary between the pulp fiber region and the polymer region as a result of penetration of the aqueous polymer solution into the pulp layer with a prescribed water content. To the contrary, the container 1 of the present embodiment shows a clear boundary between these regions because penetration of the synthetic resin is suppressed, as will be understood from the description of the method of production described later. It follows that a smaller amount of a synthetic resin than conventionally used is capable of imparting waterproofness and moistureproofness to a pulp molded article and that the pulp fiber has satisfactory disintegrability when recycled.

A relative relationship between the thickness of the resin layer 3 and that of the molded article 2, expressed in former/latter thickness ratio, is 1/2 to 1/100, preferably 1/5 to 1/50. If this ratio exceeds 1/2, the container has poor disintegrability on recycling. If it is less than 1/100, sufficient water and moisture proofness is not obtained. The thickness of the molded article 2 is selected appropriately according to the use of the container 1 within a range agreeing with the above thickness ratio of 1/2 to 1/100. It is preferably from 100 to 3000 μm, still preferably from 500 to 2000 μm.

The resin layer 3 is formed of various synthetic resins. The synthetic resins include acrylic resins, styrene-acrylic resins, ethylene-vinyl acetate resins, styrene-butadiene rubber resins, polyvinyl alcohol resins, vinylidene chloride resins, waxy resins, fluororesins, silicone resins, urethane resins, melamine resins, epoxy resins, and copolymers or polyblends comprising the recited resins. The coating to be applied may be a solution or a dispersion of the synthetic resin(s).

The solvent (or medium) of the synthetic resin-containing coating may be either aqueous or organic. The coating may contain various additives in addition to the synthetic resin, such as colorants, e.g., various pigments, leveling agents, e.g., acrylate polymers or silicone resins, and pinhole preventives, e.g., benzoin.

It is desirable for the container 1 to have a water vapor transmission rate of 100 g/(m$^2$.24 hr) or less, preferably 60 g/(m$^2$.24 hr) or less, as measured by cup method in accordance with JIS Z0208. Within this range, the container 1 hardly absorbs moisture in the air thereby to retain rigidity suitable as a hollow container and effectively protect the contents against quality deterioration due to water absorption, that is, to improve storage stability of the contents. While a smaller water vapor transmission rate promises a higher waterproofness and moistureproofness, a practically achievable lower limit is about 0.5 g/(m$^2$.24 hr).

A preferred method for producing the above-described container 1 will be described by referring to FIG. 2. FIGS. 2A to 2D sequentially show the papermaking step out of the steps involved for the production of the pulp molded article 2 of the container 1. More specifically, FIG. 2A is the step of papermaking; FIG. 2B the step of inserting a pressing member; FIG. 2C the step of pressing and dewatering; and FIG. 2D the step of opening a papermaking mold to take out a pulp layer.

As shown in FIG. 2A, a pulp slurry is poured into a cavity 13 of prescribed shape of a papermaking mold 10 which is formed by closing a pair of splits 11 and 12 together. Each split 11 or 12 has a plurality of interconnecting holes 14 which connect the cavity 13 to the outside. The inner side of each split 11 or 12 is covered with net having a prescribed mesh size (not shown). In this embodiment the shape of the cavity 13 agrees with the contour of a molded article 2 to be produced. The shape of the cavity 13 is not limited to the one shown A pulp slurry contains pulp fiber as a main material. Where other materials are used in addition to pulp fiber, the proportion of the other materials is preferably 1 to 70% by weight, particularly 5 to 50% by weight, based on the weight of the resulting molded article 2. The other materials include inorganic substances, such as talc and kaolinite, inorganic fibers, such as glass fiber and carbon fiber; powdered or fibrous synthetic resins, such as polyolefins; non-wood or plant fibers; polysaccharides; and the like.

Then the cavity 13 is evacuated by suction through the splits 11 and 12 to suck up the water content of the pulp slurry thereby to deposit pulp fibers on the inner wall of the cavity 13. As a result, pulp fibers are deposited on the inner wall of the cavity 13 to form a pulp layer 15.

After a prescribed amount of the pulp slurry is poured into the cavity 13, pouring is stopped, and the cavity 13 is completely dewatered by suction. An elastic and inflatable hollow pressing member 16 is inserted into the cavity 13 while continuing sucking and evacuating the cavity 13 as shown in FIG. 2B. The pressing member 16 is to be inflated in the cavity 13 like a balloon to press the pulp layer 15 toward the inner wall of the cavity 13 thereby to transfer the inner configuration of the cavity 13 and to dewater the pulp layer 15 by pressing. The pressing member 16 is made of urethane, fluororubber, silicone rubber, elastomers, etc., which are excellent in tensile strength, impact resilience, and stretchability. The pressing member 16 may be a hollow bag.

As shown in FIG. 2C, a prescribed pressurizing fluid is fed into the pressing member 16 to inflate it. The inflated pressing member 16 presses the pulp layer 15 to the inner wall of the cavity 13. While the pulp layer 15 is pressed onto the inner wall of the cavity 13 by the inflated pressing member 16, the configuration of the inner wall of the cavity 13 is transferred thereto, and dewatering further proceeds concurrently. The pressurizing fluid for inflating the pressing member 16 includes compressed air (heated air), oil (heated oil) and other various liquids. The pressure for feeding the pressurizing fluid is preferably 0.01 to 5 MPa, particularly 0.1 to 3 MPa.

Pressed from the inside to the inner wall of the cavity 13, the pulp layer 15 increases its density (i.e., decreases its void) so that a synthetic resin emulsion applied thereto as hereinafter described is inhibited from penetrating into the pulp layer 15. The molding article 2 obtained by the above-described method preferably has a void of 30 to 70%, particularly 40 to 60%. A void is calculated from formula (1) shown below. In formula (1), the density of a molded article is calculated from the weight and the thickness of a sample cut out of the molded article, and the density of materials constituting the molded article is calculated from the proportions and the densities of pulp fiber and other components.

$$\text{Void (\%)} = [1 - (\text{density of molded article}/\text{density of materials constituting molded article})] \times 100 \quad (1)$$

By the above-described pressing, the inner and outer surfaces of the pulp layer 15 are made smooth. As a result, the surface profile of the inner or outer surface of the molded article 2 obtained by this method is such that the centerline average roughness (Ra: a value measured in accordance with JIS B0601) is 0.5 to 20 μm, preferably 0.5 to 10 μm, and is preferably such that a maximum height ($R_{max}$: a value measured in accordance with JIS B0601) is 1 to 500 μm, particularly 5 to 100 μm. With such a surface profile, a coating can be applied without allowing the synthetic resin emulsion to penetrate too much into the pulp layer 15 the outer surface of the molded article 2 can be printed neatly and easily, and the container 1 has a further improved appearance. The surface roughness was measured with a Surfcom 120A, supplied by Tokyo Seimitsu Co., Ltd., under the following measuring conditions—cutoff: 0.8 mm; evaluation length: 10 mm; filter: 2CR; magnification: 500; tilt correction: linear; polarity: standard.

If the pulp layer 15 and the molded article 2 have its void decreased excessively by the pressing, the penetrability of the emulsion may be too small to assure adhesion to the resin layer 3. Therefore, taking the penetrability of the emulsion into consideration, the molded article 2 is preferably formed so as to have a Cobb's water absorptiveness (JIS P8140) of 5 to 600 g/(m².2 min), particularly 10 to 200 g/(m².2 min).

The inner configuration of the cavity 13 can be transferred to the pulp layer 15 by the pressing with good precision however complicated the configuration may be. Unlike a conventional production method, a step of joining molded parts is not necessary so that the resulting molded article 2 has neither seams nor thicker-walled parts which would result from such joining. Thus, the resulting molded article 2 has enhanced strength and satisfactory outer appearance.

After the configuration of the inner wall of the cavity 13 is sufficiently transferred to the pulp layer 15 and the pulp layer 15 is press-dewatered to a prescribed water content, the pressurizing fluid is withdrawn from the pressing member 16 whereupon the pressing member 16 shrinks automatically to its original size as shown in FIG. 2D. The shrunken pressing member 16 is taken from the cavity 13, and the papermaking mold 10 is opened to remove the wet pulp layer 15 having the prescribed water content. Taking handling properties and the like into consideration, the water content of the pulp layer 15 in this stage is preferably about 50 to 80% by weight.

The pulp layer 15 thus taken out is then subjected to the steps of preliminary drying, emulsion application, and drying. In these steps, the same operation as in the papermaking step shown in FIG. 2 is conducted with the same apparatus, except that papermaking and dewatering are not carried out. That is, a heating mold, which is composed of a set of splits butted together to form a cavity in conformity to the outer contour of a desired molded article 2, is heated to a prescribed temperature, and the wet pulp layer is placed into the heating mold.

A pressing member similar to the pressing member 16 used in the papermaking step is put into the pulp layer, and a pressurizing fluid is fed into the pressing member to inflate it, whereby the pulp layer is pressed onto the inner wall of the cavity by the inflated pressing member and dried preliminarily. The material of the pressing member and the pressure for feeding the pressurizing fluid can be the same as those used in the papermaking step. The pressing with the pressing member increases the density (i.e., decreases the void) of the pulp layer further.

After the pulp layer is dried preliminarily to a prescribed water content (about 0.1 to 25% by weight), the pressurizing fluid is withdrawn from the pressing member, and the shrunken pressing member is taken out. A synthetic resin emulsion is sprayed inside the pulp layer by a prescribed spraying means to apply the emulsion to the inner surface of the pulp layer. The emulsion can be applied by dipping or brush coating instead of spraying. Since the pulp layer has an increased density with a reduced void as stated above, the emulsion hardly penetrates inside the pulp layer. Since most of the emulsion stays on the surface of the pulp layer, sufficient waterproofness and moistureproofness can be imparted with a smaller amount of the emulsion than conventionally required, and reduction in disintegrability of the pulp fiber in recycling can be prevented. It is preferred to use an emulsion having a synthetic resin particle size of about 0.01 to 10 μm from the viewpoint of control of emulsion's penetration into the pulp layer.

The emulsion coating layer and the pulp layer in the above-described state are dried in a heating mold to convert the coating layer to a resin layer and convert the pulp layer to a molded article 2. On thoroughly drying, the heating mold is opened to remove a container 1 comprising the molded article 2 having the resin layer 3 in the inner surface thereof.

The second to fifth embodiments of the pulp molded container according to the present invention will be described with reference to FIGS. 3 through 10. Only the particulars different from the first embodiment will be described. The description about the first embodiment appropriately applies to the particulars that are not described here. The members in FIGS. 3 through 10 which are the same as those in FIGS. 1 and 2 are given the same numerical references as used in FIGS. 1 and 2.

Figure 3A:
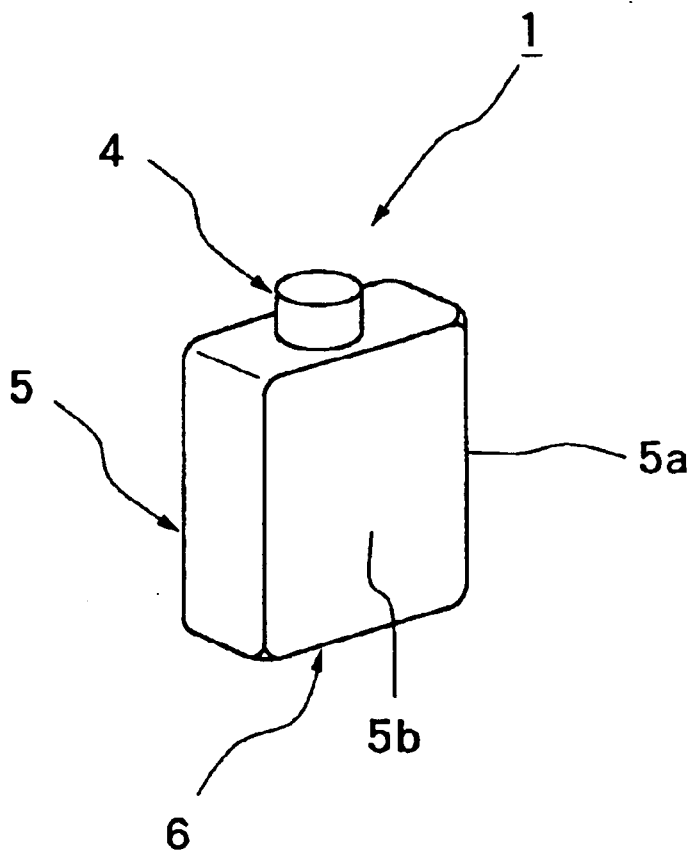
FIG. 3A is a perspective of a pulp molded container according to a second embodiment of the present invention.
Figure 3B:
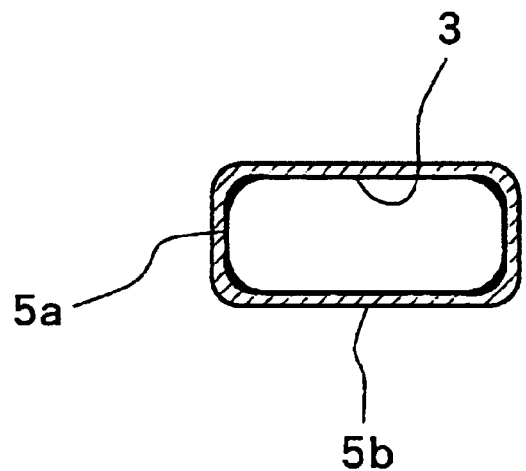
FIG. 3B is a horizontal cross-section of FIG. 3A.

FIGS. 3A and 3B show the second embodiment of the pulp molded container of the present invention. The pulp molded container 1 according to this embodiment has an opening portion 4, a body 5, and a bottom 6 with corners in the body 5 and between the body 5 and the bottom 6. The pulp molded container 1 has a resin layer 3 on the inner surface thereof. The body 5 of the pulp molded container 1 is made up of corners 5a and flat portions 5b. The resin layer 3 in the corners 5a is thicker than that in the flat portions 5b. The resin layer 3 in the corners 5a can be made thicker than that in the flat portions 5b by, for example, increasing the coating weight per unit area in the corners 5a over that in the flat portions 5b (the portions of the body 5 except the corners 5a).

In order for the pulp molded container according to the present embodiment to exhibit uniform performance properties such as waterproofness, moistureproofness, and gas barrier properties, throughout the container inclusive of the corners 5a, the ratio of the thickness of the resin layer 3 on the surface of the corners 5a to the thickness of the resin layer 3 on the surface of the flat portions 5b is preferably 1.05 to 1.5, still preferably 1.1 to 2.0.

In order to provide a larger coating weight per unit area on the surface of the corners 5a than on the surface of the flat portions 5b, it is preferred to adopt a method in which a coating is applied while rotating a pulp molded article at a prescribed angle as described later. In particular, the centrifugal force generated by rotating the pulp molded article at an appropriately adjusted number of rotations can be taken advantage of to provide a larger coating weight per unit area to the surface of the corners 5a than the surface of the flat portions 5b.

The container according to the present embodiment is preferably produced by forming a resin layer on the surface of a pulp molded article while rotating the pulp molded article on a prescribed axis for at least the time from after applying the coating until the undried resin layer formed on the surface of the pulp molded article becomes tack-free.

The language "the time after applying the coating until the undried resin layer formed on the surface of the pulp molded article becomes tack-free" as used herein means the time until the resin layer becomes such a state that the applied coating no more flows to cause sags or thickness unevenness when the rotation is stopped to make the molded article still. Specifically, a resin layer is judged to be tack-free if touching the resin layer with naked fingers or fingers wearing powder-free gloves made of latices, etc. leaves no traces. Evaluation of tack-free dryness should be done immediately after stopping rotating the molded article. The time required for the coating layer immediately after application to get tack-free, i.e., tack-free time depends on the kind of the coating, the conditions of forming the resin layer (temperature, humidity, etc.), the water content of the pulp molded article immediately before being coated, and so forth. For example, where an aqueous emulsion type coating containing an acrylic resin as a solid component is applied to the surface of a pulp molded article having a water content of 4% by weight and dried at about 100° C., the tack-free time is generally 30 to 150 seconds.

Methods of applying a coating include a spraying method and a method in which a pulp molded article is dipped in a tank filled with a coating. A pulp molded article which is a container can also be coated by pouring a coating in the molded article and then discharging the coating.

The coating thickness of the coating which provides an undried resin layer is preferably 20 to 300 µm, still preferably 40 to 200 µm, to sufficiently impart waterproofness, moistureproofness, and gas barrier properties or to form a thick resin layer possessing various performance properties such as waterproofness, moistureproofness, and gas barrier properties.

The coating weight which provides an undried resin layer is preferably 20 to 300 $g/m^2$, still preferably 40 to 200 $g/m^2$, to sufficiently impart waterproofness, moistureproofness, and gas barrier properties or to form a thick resin layer possessing various performance properties such as waterproofness, moistureproofness, and gas barrier properties.

In the case where a pulp molded article having formed thereon an undried resin layer is rotated on a prescribed axis, the term "prescribed axis" is an axis passing through the center of gravity of the molded article. It is possible to continue rotating the pulp molded article on two axes—the prescribed axis plus another axis at a prescribed angle with respect to the prescribed axis. The maximum peripheral speed on the prescribed axis is preferably 7 to 1300 m/min, still preferably 15 to 80 m/min, for preventing sags, etc. of the coating and for securing uniformity of the above-described various performance properties. The peripheral speed may be either constant or varied according to the form of the molded article on which the resin layer is provided.

After a pulp molded article is rotated on a prescribed axis until the undried resin layer formed on the surface thereof becomes tack-free, the resin layer is dried. The method of drying the resin layer is chosen appropriately according to the coating which forms the resin layer. For example, the resin layer is dried by blowing a flow of heated gas, such as air, or irradiating with infrared rays, far-infrared rays, microwaves, ultraviolet rays, electron rays, etc. Preferred are the method comprising blowing a flow of heated gas, e.g., air, or irradiating with infrared rays or far-infrared rays from the standpoint of the scale of equipment for the production, handling properties, and the like. The drying time is decided appropriately according to the composition of the resin layer, the thickness of the resin layer, and the method of drying.

In order to dry the resin layer evenly to achieve uniform performance, such as waterproofness, moistureproofness, and gas barrier properties, it is preferred to continue rotating the pulp molded article on the prescribed axis in the drying step after it has been rotated on that axis until the undried resin layer formed on the surface of the pulp molded article gets tack-free.

Figure 4A:
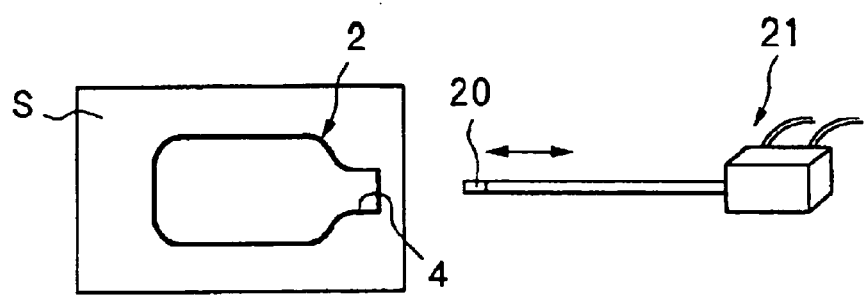

The method of forming the resin layer in the present embodiment will be described in more detail with reference to FIGS. 4 and 5. An embodiment in which a resin layer is formed on the inner and outer surfaces of a pulp molded article 2 which is a hollow bottle is taken for instance.

Where a resin layer is to be formed in the inner surface of a molded article 2, the molded article 2 is held on its bottom side by a prescribed holding means (not shown) horizontally and rotatably on its central axis C as shown in FIG. 4A, and a nozzle head 20 of a spraying apparatus 21 is inserted in the molded article 2 through the opening 4.

Figure 4B:
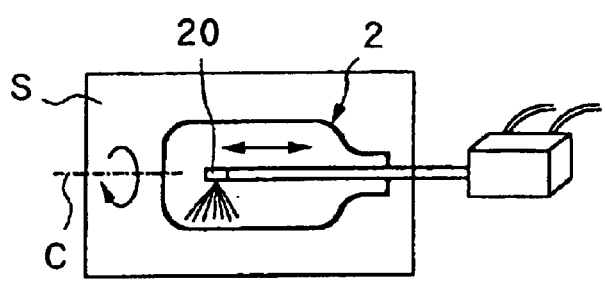

As shown in FIG. 4B the molded article 2 is rotated around its central axis C at a prescribed rotational speed by the holding means. The nozzle head 20 inserted into the molded article 2 is moved horizontally to apply a coating to the body and the opening portion. In this spray coating step, either one of the molded article 2 and the nozzle head 20 is rotated so that the nozzle head 20 is made to rotate with the molded article 2 fixed.

Figure 4C:
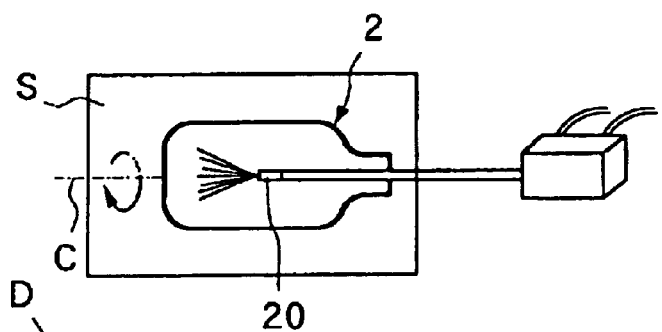

Subsequently the nozzle head 20 is set at a predetermined position to apply the coating to the bottom of the molded article 2 while rotating the molded article 2 at a prescribed rotational speed as shown in FIG. 4C. Then, the rotation of the molded article 2 is continued until the undried resin layer formed on the surface thereof becomes tack-free. The spraying apparatus 21 includes an air spray coater, an airless spray coater, and an electrostatic spray coater. The direction and width of the spray from the nozzle head 20 to be applied to the molded article 2 are decided appropriately according to the configuration of the molded article 2. For example, corners of the molded article may be coated by using a nozzle head having a narrow spray width, or a nozzle head having a wide spray width and capable of making a radial spray may be used to coat a wide area of the inner surface of the molded article.

Figure 4D:
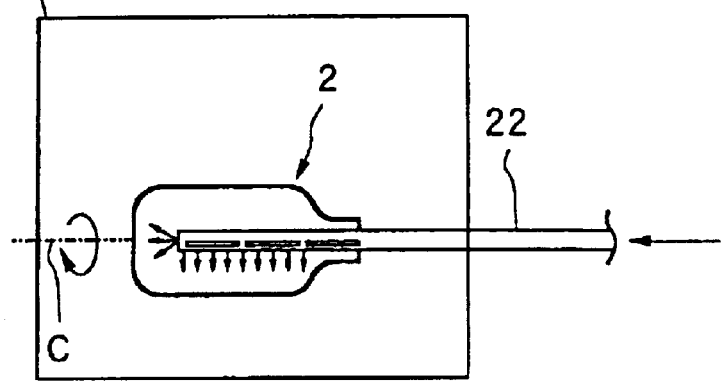
Figure 5A:
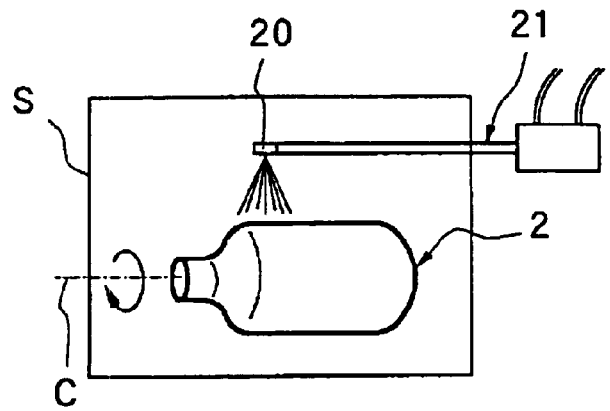

As shown in FIG. 4D, the molded article 2 is transferred from the coating booth S to a drying booth D, where the molded article 2 is held horizontal and rotated on its central axis C at a prescribed rotational speed in the same manner as described above. As shown in the Figure, a nozzle 22 capable of blowing a hot air curtain at a prescribed temperature is inserted into the molded article 2 to dry the undried resin layer formed on the inner surface of the molded article 2.

Where a resin layer is to be formed on the outer surface of the molded article 2, the molded article 2 is transferred into a drying booth S for outer surface coating as shown in FIG. 5A. In this case, a holding means (not shown) is inserted into the molded article 2 through the opening to fix and hold the molded article 2 horizontal so that the molded article 2 may be rotated on its central axis C. The molded article 2 may have an extra portion extending from its opening, which is to be removed later, so that a holding means may grasp that portion. The molded article held horizontal is rotated on its central axis at a prescribed rotational speed. A nozzle head 20 is moved horizontally at a predetermined distance above the molded article 2 to apply a prescribed amount of a coating to the outer surface from the opening to the body of the molded article 2.

Figure 5B:
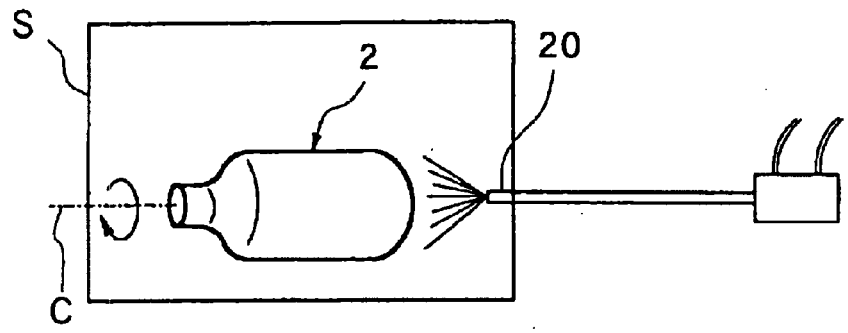

As shown in FIG. 5B, the outer surface of the bottom of the molded article 2 is then coated with a prescribed amount of the coating by the nozzle head 20 placed at a predetermined distance from that bottom while rotating the molded article 2 at a prescribed rotational speed. The rotation of the molded article 2 is continued until the undried resin layer formed on the surface becomes tack-free.

Figure 5C:
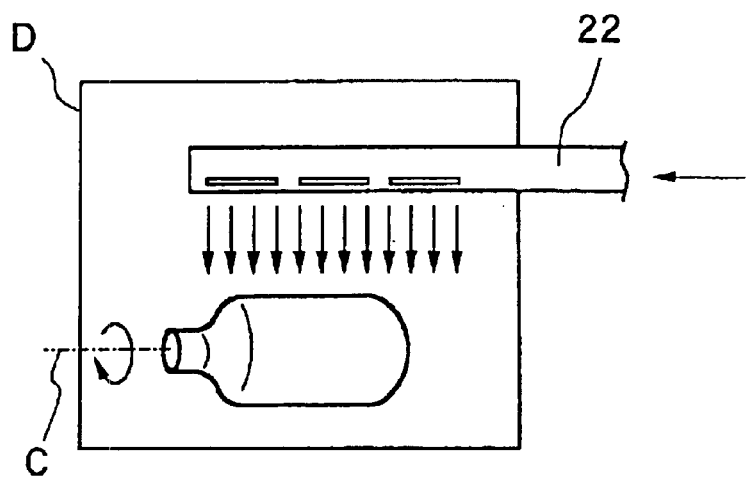

As shown in FIG. 5C, the molded article 2 is transferred from the coating booth S to a drying booth D, where it is held horizontally and rotated on its central axis C at a prescribed rotational speed in the same manner as described above. It is desirable to keep the molded article rotated while it is transferred from the coating booth S to the drying booth D. As shown in FIG. 5C, a nozzle 22 capable of blowing a hot air curtain is placed at a predetermined position above the molded article 2, and hot air at a prescribed temperature is blown for a prescribed time to dry the undried resin layer formed on the outer surface of the molded article 2.

According to the above-mentioned method, a resin layer uniformly imparting desired performance properties can be formed efficiently on the inner and outer surfaces of the molded article 2. The pulp molded container thus obtained exhibits desired performance uniformly on the inner or outer surface thereof.

Another method for forming a resin layer on the inner and/or the outer surfaces of a pulp molded article is illustrated in FIGS. 6 and 7.

Figure 6A:
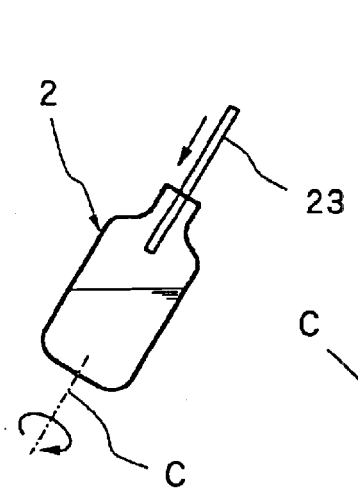
Figure 6B:
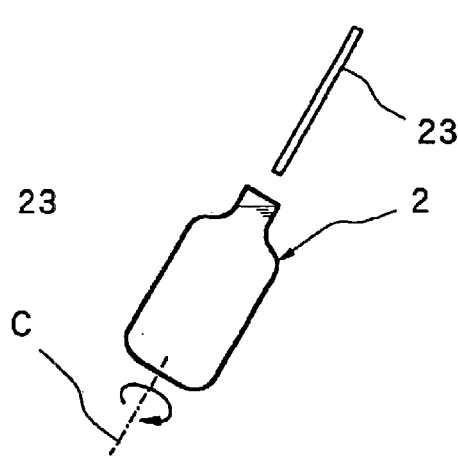
Figure 6C:
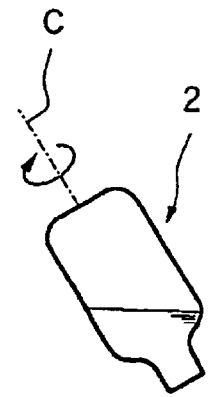

FIGS. 6A to 6C shows a method of forming a resin layer on the inner surface of a molded article 2. The molded article 2 is held rotatably on its central axis by a holding means (not shown) with its opening up making a prescribed tilt angle between a vertical axis and its central axis C as shown in FIG. 6A. A nozzle 23 for feeding a coating is inserted into the molded article 2 through the opening, and the coating is fed into the molded article 2 from the feed nozzle 23 while rotating the molded article 2 on its central axis at a prescribed rotational speed. After the feed nozzle 23 is withdrawn from the molded article 2 as shown in FIG. 6B, the molded article 2 is inverted in a vertical plane on a horizontal axis while being rotated as shown in FIG. 6C. In this state, the coating in the molded article 2 is discharged while continuing rotating the molded article 2 on its central axis C.

Figure 7A:
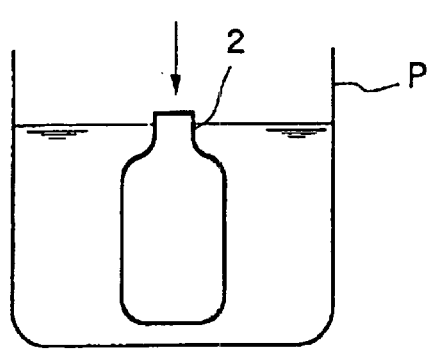
Figure 7B:

FIGS. 7A and 7B show a method of forming a resin layer on the outer surface of a molded article 2. A holding means (not shown) holds the opening portion of the molded article 2 and immerses the molded article 2 in a tank P filled with a coating for a prescribed immersion time. After taking out the molded article 2 from the tank P, the holding means rotates the molded article 2 around the central axis C at a prescribed tilt angle from a vertical axis to remove the excess of the coating attached to the outer surface of the molded article 2. In this way of forming a resin layer, the resin layer can have a greater thickness on the corner 5a' between the body and the bottom of the molded article 2 than on the body (the other portion). As a result, the corner 5a' and the body are equal in performance. Instead of immersing the molded article 2 in the tank P, a coating can be applied by showering a coating ejected from a shower nozzle onto the outer surface of the molded article 2.

Where a pulp molded article of the second embodiment has an elliptic transverse section in its body, the corner as referred to above is the portions having a larger curvature at both ends of the major axis.

Figure 8:
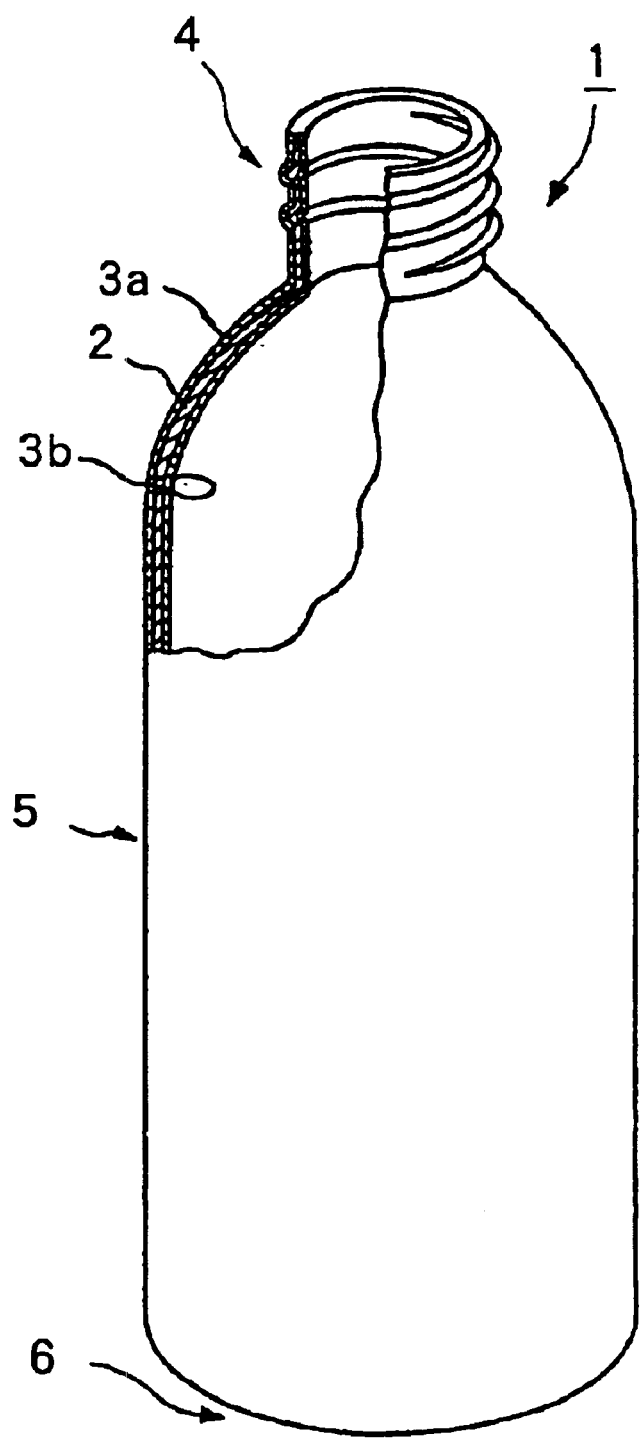
FIG. 8 shows a perspective of a pulp molded container according to a third embodiment of the present invention, with a part cut away.

FIG. 8 illustrates a perspective of a pulp molded article according to the third embodiment of the present invention, with a part cut away. The container 1 shown in FIG. 8 has resin layers 3a and 3b on the outer and the inner surfaces, respectively, of a pulp molded article 2. In what follows, the resin layer formed on the outer surface will be referred to as an outer layer, and that formed on the inner surface as an inner layer. The container 1 is a cylindrical bottle made up of an opening portion 4 having an open neck, a body 5, and a bottom 6. The body 5 and the bottom 6 of the container 1 have approximately the same diameter. The neck has a smaller diameter than the body 5. In this particular embodiment, the body 5 has a diameter of 20 to 100 mm, particularly 40 to 80 mm, and the neck has a diameter of 10 to 50 mm, particularly 15 to 35 mm.

The container 1's body 5 makes an angle of approximately 90° with the bottom 6. In other words, the body 5 has a tapering angle of approximately 0°. The container 1 according to this embodiment has a total height of 50 mm or more, particularly 100 mm or more.

The outer layer 3a and the inner layer 3b are formed on the entire outer and inner surfaces of the molded article 2. The container 1 is thus protected against attack of moisture or oxygen from the outside. As a result, the container 1 is prevented from reducing its paper strength and capable of protecting the contents from mold growth and quality deterioration due to moisture or oxygen attack. The container 1 has enhanced water resistance to effectively prevent leaks of liquid contents.

In the present embodiment, the outer layer 3a and the inner layer 3b of the container 1 are different in moisture permeability. With different moisture permeabilities, blistering can be prevented effectively while avoiding reduction of barrier properties of the container 1 against gas or liquid. Deterioration in appearance of the container 1 is also prevented. In detail, where, for example, an outer layer 3a is first formed with a smaller thickness than an inner layer 3b so that the outer layer 3a may have relatively high moisture permeability, and an inner layer 3b is then formed with a relatively large thickness so as to have relatively low moisture permeability, the solvent which volatilizes on drying the inner layer 3b is allowed to escape outside through the molded article 2 and the outer layer 3a having relatively high moisture permeability and hardly stays inside. As a result, development of blisters can be prevented. Besides, having a resin layer on both the inner and outer surfaces of the molded article 2, the container 1 exhibits extremely high barrier properties against gas or liquid. Conversely, where an outer layer 3a with relatively low moisture permeability is formed first, and an inner layer 3b with relatively high moisture permeability is then formed, the solvent volatilizing in forming the inner layer 3b is let to escape outside through the inner layer 3b thereby preventing blistering as well.

The moisture permeability as used herein is a water vapor transmission rate as measured according to JIS Z0208. Specifically, a test piece is cut out of the container 1, and one of the resin layers is removed by any mechanical means such as scraping. The moisture permeability is measured on the resulting specimen having the molded article 2 and the other resin layer adhered thereto. Existence of the molded article 2 does not interfere with the measurement of the resin layer's moisture permeability because the resin layer's moisture permeability is incomparably smaller than the molded article 2's.

In order to prevent blistering more effectively, it is preferred that there be a difference of 10 g/(m².24 hr) or more, particularly 20 to 300 g/(m².24 hr), between the moisture permeability of the outer layer 3a and that of the inner layer 3b. With a moisture permeability difference smaller than 10 g/(m².24 hr), blisters can develop, which is unfavorable for appearance. With a moisture permeability difference greater than 300 g/(m².24 hr), the steam barrier properties or water resistance as required of a container tends to be reduced, resulting in an unfavorable appearance or a failure to assure storage stability of the contents. For example, where a hygroscopic substance such as detergent powder is kept in the container, caking can result. Where a volatile substance such as an alcohol is held in the container, a weight loss can result.

As to an absolute value, it is preferred for either one of the outer layer 3a and the inner layer 3b to have a moisture permeability of 100 g/(m².24 hr) or less, particularly 10 to 50 g/(m².24 hr). With a moisture permeability exceeding 100 g/(m².24 hr), the container 1 will have insufficient barrier properties. Where a hygroscopic substance such as detergent powder is put into the container, caking can result. Where a volatile substance is kept in the container, a weight loss can result.

It is preferred for the other layer to have a moisture permeability of 20 g/(m².24 hr) or more, particularly 30 to 350 g/(m².24 hr). With a moisture permeability of the other layer being less than 20 g/(m².24 hr), blisters can develop on drying the resin layer, resulting in an unfavorable appearance. With a moisture permeability exceeding 350 g/(m².24 hr), the container 1 tends to have insufficient water resistance or barrier properties, which can result in strength reduction or deterioration of appearance of the container 1 due to water absorption.

The relative relationship between the outer layer 3a and the inner layer 3b with respect to moisture permeability is decided appropriately depending on the contents to be kept in the container 1. For example, seeing that prevention of liquid leakage from the inside to the outside of the container 1 is of importance where the container 1 is filed with liquid, the moisture permeability of the inner layer 3b is preferably made smaller than that of the outer layer 3a. Where the container 1 is for holding powder, since it is important to block penetration of gas from the outside to the inside of the container 1 thereby preventing denaturation of the powder, the moisture permeability of the outer layer 3a is preferably made smaller than that of the inner layer 3b.

Where the resin layer is applied with a large thickness, cases are sometimes met with in which air bubbles resulting from solvent volatilization are entrapped in the layer to reduce the barrier properties. In order to prevent such air entrapment, it is effective to thinly apply a coating several times instead of applying a thick coat at a time.

It is preferred that one of the outer layer 3a and the inner layer 3b be thinner than the other, or it is preferred that one of the layers be made of a composition having a higher moisture permeability (for example, a cheaper material) than that for the other. By this manipulation blister development can be prevented more effectively.

The synthetic resin making the outer layer 3a and that making the inner layer 3b may be either the same or different, which depends on the kind of the contents to be put into the container 1 and the like.

Figure 9:
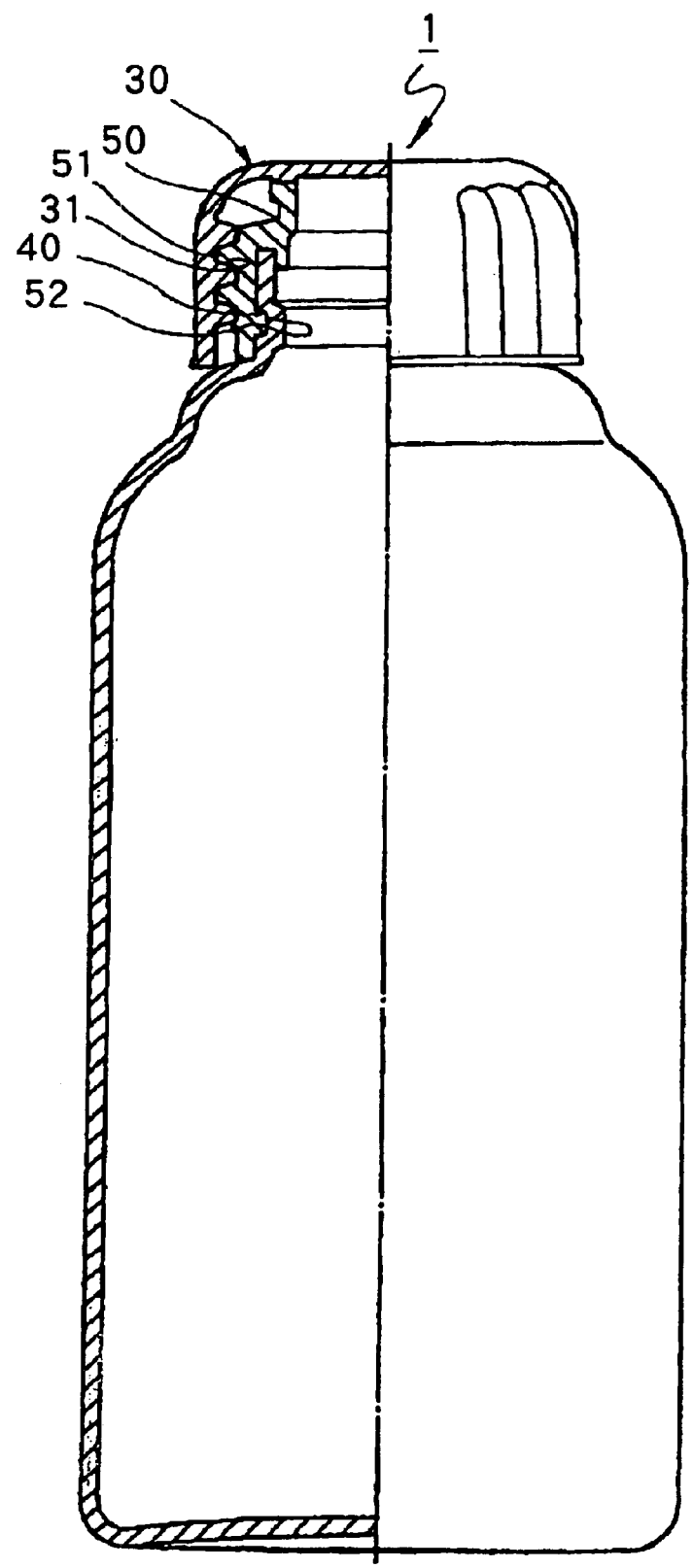
FIG. 9 is a view of a pulp molded article according to a fourth embodiment of the present invention, with its half representing a cross-section.

FIG. 9 shows a pulp molded container according to the fourth embodiment of the present invention. The pulp molded container 1 of this embodiment has a resin layer (not shown) on the outer and inner surfaces thereof. The pulp molded container 1 has a molded piece 50 fitted on the opening portion thereof and a cap 30 screwed on the molded piece 50.

The opening portion of the container 1 has a mating recess 40 formed around its outer periphery. On the other hand, the molded piece 50 has a mating projection 52 formed around the inner periphery of its peripheral wall portion. The molded piece 50 is fitted on the opening portion of the container 1 by engaging the mating recess 40 and the mating projection 50 with each other. The molded piece 50 has a thread 51 formed on its outer periphery. The cap 30 is designed to screw on the container 1 with its thread groove 31 and the thread 51 engaged with each other.

In this embodiment, the container 1 with the molded piece 50 fitted on preferably has a compressive strength of 10 to 1000 N, particularly 100 to 700, in its longitudinal direction (longitudinal compressive strength) so as to withstand use in an ordinary way and to assure ease of separation for separated garbage collection (hereinafter also referred to as ease of separated disposal). Further, it is preferred that the molded piece 50 in the state attached to the container 1 has a compressive strength of 10 to 500 N, particularly 100 to 300 N, when compressed from its side (breaking strength in transverse compression; see Examples).

The pulp molded article 2 constructing the pulp molded container 1 preferably has a density (the density of the wall of the molded article) of 0.4 to 2.0 g/cm$^3$ to exhibit satisfactory mechanical properties, such as tensile strength and compressive strength, and suitable rigidity fit for use as a hollow container. The density is still preferably 0.6 to 1.5 g/cm$^3$ to provide a container more convenient to use.

The molded piece 50 fitted on the opening portion of the pulp molded container 1 and the cap 30 screwing on the molded piece 50 are both made of a composition comprising natural fiber and a binder.

The natural fiber to be used is incinerable fiber or powder. The term "incinerable" as used herein means "capable of being incinerated with minimum generation of environmentally harmful substances". The fiber or powder is preferably made of a material which is naturally occurring as well as incinerable. The language "a naturally occurring material" is used to include a naturally occurring material itself and a material prepared by primarily or further processing a naturally occurring material. This language includes what is generally called "biomass". The incinerable fiber or powder, particularly the incinerable fiber or powder made of the naturally-occurring material includes pulp (virgin pulp and used paper pulp), woodmeal, cotton, flax, silk, wool, feather, and dry foodstuff powders, such as chaff and soy pulp (tofu waste). These materials can be used either individually or as a combination of two or more thereof. From the standpoint of availability, supply stability, and low cost, preferred of them are virgin pulp, used paper pulp, and so forth.

The fiber and the powder can be used either individually or as a mixture thereof. The fiber length or the particle size are not particularly limited and selected according to the moldability depending on the shape of the molded piece 50 and the cap 30 and the strength required of the molded piece 50 and the cap 30. For example, when the molded piece 50 or the cap 30 is formed by injection molding using a pin gate having a diameter of about 0.5 to 2 mm, the fiber length or particle size is preferably small enough to be classified by a filter of #100 or a finer mesh.

The proportion of the fiber or powder in the composition is preferably 40 to 90% by weight, still preferably 40 to 80% by weight, particularly preferably 40 to 60% by weight, for assuring ease of separated disposal while retaining moldability. From a different viewpoint, i.e., for assuring incinerability of the waste while retaining moldability, a preferred proportion of the fiber or powder in the composition is more than 50 up to 90% by weight, particularly 51 to 80% by weight, especially 51 to 55% by weight.

The binder which can be used includes thermoplastic resins, biodegradable polymers, and natural polysaccharides. The thermoplastic resins include those usually employed for plastic moldings, such as polyolefin resins, e.g., polyethylene, polypropylene, and polyvinyl acetate, polyester resins, e.g., polyethylene terephthalate, polyamide resins, e.g., nylon, polyvinyl resins, e.g., polyvinyl chloride, polystyrene, and polyvinyl alcohol, and/or copolymers thereof. The thermoplastic resins can be used either individually or as a mixture of two or more thereof. The biodegradable polymers include polyhydroxybutyric acid and derivatives thereof, polymers of microorganism origin, e.g., biocellulose and Pullulan, and chemically synthesized polymers, e.g., polycaprolactone, polylactic acid, and aliphatic polyesters. These biodegradable polymers can be used either individually or as a mixture of two or more thereof. The natural polysaccharides include starch, chitin, chitosan, carrageenan, agar, and lignin. Proteins, such as wheat gluten and gelatin, are also useful.

If necessary, the composition forming the molded piece 50 and the cap 30 can further comprise other components in addition to the above-described natural fiber and binder. Such components include assistants, such as inorganic pigments, e.g., titanium oxide powder, zinc oxide powder, carbon black, chrome yellow, red iron oxide, ultramarine, and chromium oxide; organic pigments, e.g., phthalocyanine, azo pigments, and condensed polycyclic pigments; and lubricants and plasticizers, e.g., fat and oil derivatives and surface active agents. These components are added to the composition forming the molded piece 50 and the cap 30 in a proportion of 0 to 10% by weight.

The molded piece 50 and the cap 30 are produced by the following processes 1 to 3 according to the kind of the binder used.

Process 1: Thermoplastic Binder

Pellets of the above-described composition is injection molded by use of a molding machine generally used for plastic injection molding to produce the molded piece 50 and the cap 30. The injection molding conditions are selected arbitrarily. Where, in particular, it is desired to achieve excellent mold-surface transfer as obtained with plastics and to obtain a molded part with a uniform color tone, injection molding is carried out at an injection mold temperature of from Td to (Td+20)° C., wherein Td is the heat distortion temperature of the thermoplastic resin, the binder of the composition. When the injection mold temperature is lower than Td° C., the resinous content solidifies before it migrates sufficiently to the surface. It follows that the resulting molded article has surface unevenness due to short fibers or particles, failing to have a mirror finish as desired even when a mold having a mirror-smooth surface is used. If the mold temperature exceeds (Td+20)° C., resin solidification is not accelerated, and the molded article undergoes deformation after removal from the mold due to insufficient cooling. Where injection molding is carried out with the injection mold heated to (Td+10) to (Td+20)° C., particularly (Td+15) to (Td+20)° C., the resulting molded article will have further improved surface smoothness and further improved appearance. The heat distortion temperature as referred to herein is the temperature measured according to ASTM D648. In using two or more thermoplastic resins, the heat distortion temperature of the resin having the highest heat. distortion temperature of the resins is taken as a heat distortion temperature of the mixed resin.

Process 2: Biodegradable Polymer Binder

In using a biodegradable polymer binder, the composition can be injection molded in the same manner as with the thermoplastic resin binder. The injection pressure or the molding temperature are decided appropriately according to the binder's characteristics.

Process 3: Natural Polysaccharide Binder

In using a natural polysaccharide binder, the natural fiber is kneaded with the binder and a plasticizer, such as water, fats and oils or alcohols, into a paper clay-like body, which is fed into a mold and hot pressed. A papermaking-pressing process or an injection molding process is also applicable.

The molded piece 50 thus produced is snapped on the opening portion of the pulp molded container 1 to provide a tight fit, and the cap 30 is screwed on the molded piece 50.

According to the present embodiment, the pulp molded container 1, the molded piece 50, and the cap 30 can be discarded all together without causing environmental pollution. Where separately disposed of, they are easy to take apart. The pulp molded container 1 with the molded piece 50 and the cap 30 provides a tight seal and has durability withstanding repeated use.

Figure 10:
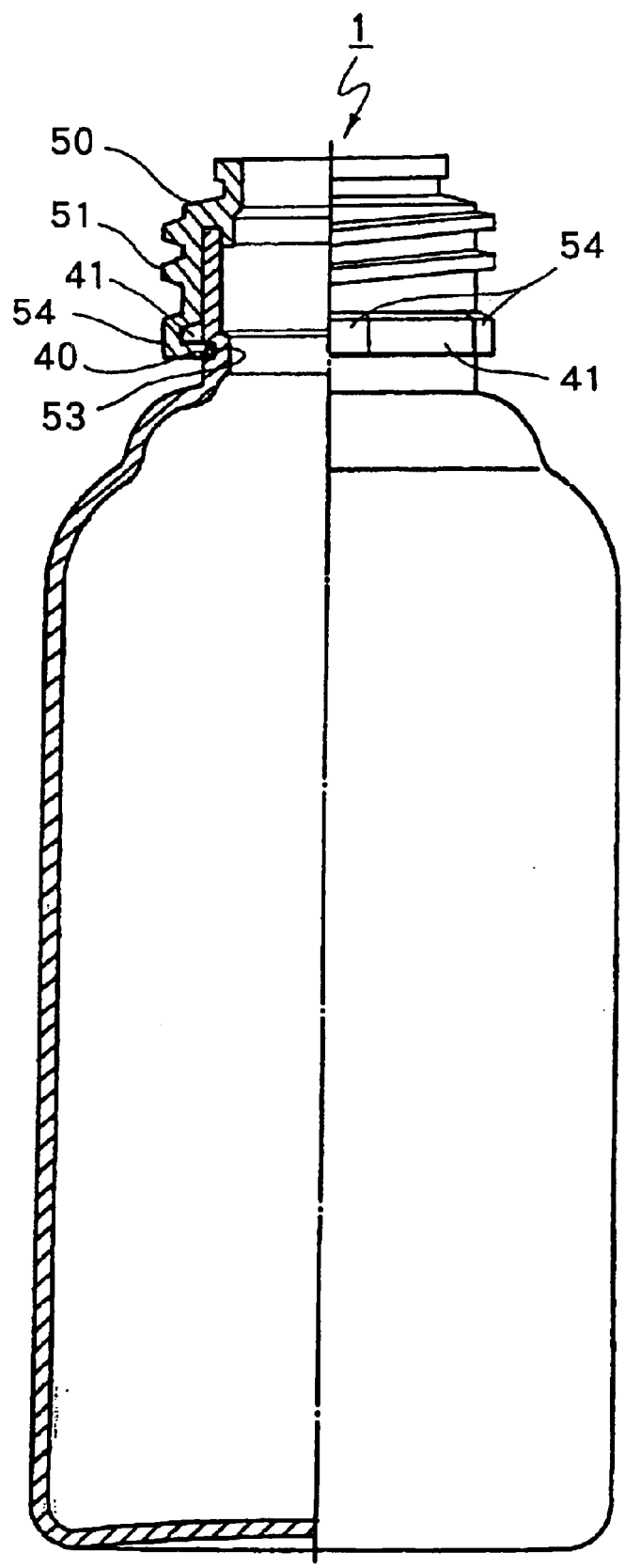
FIG. 10 is a view of a pulp molded article according to a fifth embodiment of the present invention, with its half representing a cross-section.

A container 1 according to the fifth embodiment shown in FIG. 10 is similar to the container of the fourth embodiment shown in FIG. 9, having a resin layer (not shown) on the outer and inner surfaces thereof In the pulp molded container 1 of this embodiment, the opening portion of the container 1 has mating recesses 40 and projections 41 alternately formed on its outer periphery at given intervals. A molded piece 50 has mating parts 54 having a U-shaped section which fit in between the projections 41. Each mating part 54 has, at the tip thereof, an engaging nail 53 which snaps into and out of the mating recess 40. While not shown, the pulp molded article 2 has a resin layer on the outer and the inner surfaces thereof. In the present embodiment, the molded piece 5 is pressed down on the opening portion of the container 1 to provide a tight snap fit. The pulp molded container 1 can be disposed of as such. Where separately disposed of, the molded piece 50 can be easily detached from the container 1 by pulling up the mating part 54 of the molded piece 50 to release the engagement between the recesses 40 and the engaging nails 53. The molded piece 50, while having functionally sufficient strength, is relatively easy to break manually and therefore suited to separate garbage collection and reduction in waste volume.

In the fourth and fifth embodiments, while a cylindrical molded piece 50 is fitted on a pulp molded container 1 having an open top, the position of attaching the molded piece 50 is not limited thereto. The present invention embraces any embodiment in which a molded piece 50 is attached to part of a pulp molded container. For example, a pulp molded container with its bottom open can have attached to the open bottom a molded piece designed to provide a bottom closure for the container, or a cylindrical pulp molded container with its both ends open can have attached to their top and bottom ends a molded piece having the form of a neck and a molded piece having the form of a bottom, respectively.

The manner of attaching a molded piece to a pulp molded container according to the fourth and fifth embodiments is not limited to fitting, and other means such as screwing are usable according to the properties of the contents to be put in. In addition to fitting, the molded piece may be adhered to the pulp molded container with an adhesive to provide an improved tight seal. In this case, adhesives causing little environmental pollution, such as cellulose, collagen, the above-recited polysaccharides, carboxymethyl cellulose (CMC), hydroxypropyl cellulose (HPC), and polyvinyl alcohol (PVA), are preferably used.

While, in the fourth and fifth embodiments, the pulp molded container and the molded piece are separately produced, and the molded piece is attached to the opening portion of the pulp molded container, it is possible to make them integral with each other by a method in which a pulp molded container from the step of resin layer formation is set in a mold for injection molding, and a molded piece is injection molded around the opening portion of the container.

In the fourth and fifth embodiments, where the molded piece 50 and the cap 30 contain natural fiber such as pulp fiber in a proportion of 51% by weight or more, they are generally handled as paper products in practice. In this case, however, it is highly probable that the binder such as a thermoplastic resin forms the surface layer as a result of such phenomena as flow shearing and migration of the molten resin to the surface of the mold. While the ratio of the pulp fiber and the thermoplastic resin in the surface layer depends on the molding conditions such as the mold temperature, the flowable thermoplastic resin is generally more liable to show up. As a result, the molded piece 50 and the cap 30 can look like a resin notwithstanding their high pulp fiber content and may be hardly recognizable to users as a paper product. Hence, where the molded piece 50 and/or the cap 30 are formed by injection molding pulp fiber as a main component and a resin as a secondary component, a prescribed part of the molded piece 50 and/or the cap 30 can have a torn surface that is fuzzy with pulp fibers exposed, whereby the exposed surface will have a paper-like appearance. Users then easily recognize that pulp fiber is used in the molded piece 50 and/or the cap 30.

The term "main component" as used above denotes a component having the highest proportion (weight ratio) in the raw materials making up the molded piece 50 and/or the cap 30. The term "secondary component" as used above means a component having a lower proportion than the main component.

The proportion of the pulp fiber, the main component making the molded piece 50 and/or the cap 30, is preferably 51 to 700% by weight, still preferably 53 to 57% by weight, in view of molding properties (flowability and tearability), mechanical strength, and disposability.

The resin which can be used as a secondary component constituting the molded piece 50 and/or the cap 30 includes the above-recited thermoplastic resins. The compounding proportion of the resin, being correlated to the proportion of the pulp fiber, is preferably 30 to 49% by weight, still preferably 43 to 47% by weight, in view of molding properties, mechanical strength, disposability, and cost reduction.

The molded piece 50 and/or the cap 30 can be provided with a fuzzy surface having pulp fibers fizzed by, for example, the following method. A molding material comprising pulp fiber as a main component and a resin as a secondary component is injection molded to make a molded piece 50 or a cap 30 having connected to a prescribed part thereof a tab to be torn off. The tab is torn off the molded piece 50 or the cap 30 to expose the torn surface.

In detail, injection molding is carried out using an injection mold having a first cavity and a second cavity connected to each other. The first cavity has a shape corresponding to the main molded piece, i.e., the molded piece 50 or the cap 30, and the second cavity has a shape corresponding to the tab to be torn apart. The first cavity and the second cavity are preferably disposed in such a configuration that the tab may be torn off the main part when the mold is opened. In this case, tearing can be effected simultaneously with mold opening to shorten the machine operation time.

The connecting part between the main part, i.e., the molded piece 50 or the cap 30, and the tab to be torn off is tapered toward the main part so as to make tearing easier.

The tab is torn off at the time when the main part, i.e., the molded piece 50 or the cap 30, and the tab are cooled to a prescribed temperature. If the molding material consists solely of a resin, a tearable area would be so limited. Since the molding material is a mixture of pulp fiber as a main component and a resin as a secondary component, the molded article can be torn apart over a large area. When torn apart, the molding material does not show stinginess. The tab may be torn off while the main part and the tab are being cooled.

The present invention is not limited to the above-described embodiments. For example, durability of the container 1 can be improved by attaching a reinforcing member made of plastics, etc. to a portion where a load is applied on use, such as the opening portion 4 or the bottom 6, in place of the above-described molded piece 50. Otherwise part of such a portion may be formed of plastics, etc.

The shape of the pulp molded article includes not only those described above but others, such as a cylindrical cup and a cylinder.

The resin layer formed on the outer surface of the pulp molded article can be decorated with letters, figures, symbols, etc. according to the use of the container 1.

The aforementioned embodiments are interchangeable with each other.

EXAMPLES

The present invention will now be illustrated in greater detail with reference to Examples.

Examples 1 and 2 and Comparative Example 1

A pulp molded article having the shape shown in FIG. 8 was formed by a pulp molding technique. The wall thickness was 1.0 mm. The molded article had a centerline average roughness (Ra) of 2.4 μm and a maximum height ($R_{max}$) of 30 μm on its inner surface and a centerline average roughness (Ra) of 2.6 μm and a maximum height ($R_{max}$) of 35 μm on its outer surface. The molded article had a Cobb's water absorptiveness of 25 g/(m$^2$.2 min) and a void of 58%. A coating comprising the synthetic resin emulsion shown in Table 1 and an olefinic wax was sprayed onto the outer surface of the molded article to form an outer layer whose thickness and moisture permeability are shown in Table 1. Then, the same coating was applied to the inner surface of the molded article by spray coating to form an inner layer whose thickness and moisture permeability are shown in Table 1.

The resulting pulp molded container was filled with a synthetic detergent powder, and the opening was sealed. The container and the contents were stored at 40° C. and 90% RH for 30 days, and caking of the contents was observed to evaluate storage stability. The pulp molded container was inspected for blistering. The results obtained are shown in Table 1.

pulp molded container obtained in Example 1. The container with these fitments were evaluated for strength, tight seal, torque on overrun as an indication for shape precision of the thread, and durability against repeated opening and closure. The results are shown in Table 2.

a) Molded Piece

A nozzle ring (molded piece) having a screw thread on its outer periphery was prepared by injection molding a composition having the following formulation.

Composition

Natural fiber: fiber of office paper used in office automation equipment—40 wt %
Binder: polypropylene—22 wt %
linear low-density polyethylene—35 wt %
Pigment: titanium oxide pigment—2 wt % b) Cap

A cap having a thread mating with the molded piece on the inner side of the peripheral wall thereof and a seal ring mating with the top edge of the molded piece on the inner side of the top panel thereof was prepared by using a composition having the following formulation.

Composition

Natural fiber: fiber of office paper used in office automation equipment—40 wt %
Binder: polypropylene—30 wt %
linear low-density polyethylene—22 wt %
Pigment: titanium oxide pigment—2 wt %
Assistant: monoglyceride—1 wt %

Example 4

A molded piece was prepared in the same manner as in Example 3, except for increasing the natural fiber to 51 wt % and decreasing the linear low-density polyethylene by 10 wt % to 25 wt %.

Comparative Example 2

A molded piece was prepared in the same manner as in Example 3, except for decreasing the natural fiber to 30 wt % and increasing the linear low-density polyethylene by 10 wt % to 45 wt %.

Comparative Example 3

A composition comprising 91 wt % of natural fiber, 7 wt % of polypropylene, and others (assistants) was shaped by a papermaking-pressing process.

TABLE 1

| | | Outer Layer | | Inner Layer | | | |
| --- | --- | --- | --- | --- | --- | --- | --- |
| | Synthetic Resin | Thickness (μm) | Moisture Permeability (g/m$^2$ 24 hr) | Thickness (μm) | Moisture Permeability (g/m$^2$ 24 hr) | Storage Stability | Blister Development |
| Example 1 | acrylic | 30 | 30 | 5 | 200 | o | not observed |
| Example 2 | acrylic | 30 | 30 | 15 | 70 | o | not observed |
| Comparative Example 1 | styrene-butadiene | 20 | 120 | 5 | 400 | x | not observed |

As is apparent from the results shown in Table 1, each container of Examples (the product of the present invention) has a lower moisture permeability, i.e., higher barrier properties to secure storage stability for the contents as compared with the container of Comparative Example. No blisters was observed in the containers of Examples.

Example 3

A molded piece and a cap having a function for screw closure were prepared as described below and fitted on the 1) Strength Test Strength was evaluated in terms of drop strength and vertical compressive strength which are indicative of performance for general use as a container and in terms of breaking strength in transverse compression which is indicative of ease of separated disposal.

1-1) Drop Strength

JIS Z0202 was followed. A pulp molded container having a molded piece fitted thereto was filled with a measured volume of contents (wide Hiter, 750 g, available from Kao Corp.), and a cap was screwed on. The container and the contents were dropped from a height of 1.2 m onto a concrete floor landing on its bottom, opening portion or body. Cracks of the container or leaks of the contents were examined.

1-2) Vertical Compressive Strength

A pulp molded container with a molded piece fitted and a cap screwed on was compressed in the longitudinal direction on a compression tester at a load cell speed of 20 mm/min to measure a buckling strength. A buckling strength of 700 N, which is required for general use, was regarded good (O), and a buckling strength less than that was regarded poor (x).

1-3) Breaking Strength in Transverse Compression

A molded piece as fixed to the opening portion of a pulp molded container was compressed from its side by the use of a compression tester at a load cell speed of 20 mm/min, and the breaking strength of the molded piece was measured. As a criterion of ease of separated disposal, a breaking strength of 300 N or smaller was graded good (O), and a breaking strength exceeding 300 N was graded poor (x).

2) Shape Precision

Seeing that a large clamping torque can be applied to a screw closure provided that a desired effective screw configuration is formed and the mating members have a sufficient strength, the shape precision of the screw thread was evaluated by a torque obtained in an overrun torque test which indicates the tightness of screw closure. A cap was screwed on at a constant rate (5 wpm) under a constant pressing load (10 N), and the torque (Nm) at screw failure was measured. Shape precision was judged good (O) or poor (x) when the torque causing screw failure was 30000 Nm or higher or less than 30000 Nm, respectively.

3) Tight Seal

Tightness of seal was evaluated by measuring moisture permeability (water vapor transmission rate) as follows. JIS Z0208 was followed. A pulp molded container having a volume of 1 liter, an outer diameter of 36 mm at the opening, an outer diameter of 82 mm at the body, and an outer surface area of 700 cm$^2$ was prepared. The body of the container was covered with aluminum foil, and the neck was covered with aluminum foil leaving the threaded periphery and the contact ring uncovered. The opening was closed with a resin-made cap and sealed with sealing wax. Before closure, 10 g of calcium chloride was put on a small dish, and the dish was placed in the container. The container was allowed to stand in a storage chamber at 40° C. and 90% RH for 24 hours, and the weight gain (g) of calcium chloride on the dish was measured and converted to an amount of water vapor passing through per m$^2$ to see how much water vapor had been transmitted through the edge of the opening of the pulp molded container. A moisture permeability of 10 g/m$^2$.24 hr or less was judged good (O), and one exceeding this limit was judged poor (x).

4) Durability

Simulating a state that a powder (Wide Hiter, available from Kao Corp.) kept in a pulp molded container has clogged the clearance between the molded piece and the cap, the powder was made to spontaneously adhere to the screw thread of the molded piece, and the cap was repeatedly screwed on (torque: 30000 Nm) and off. The number of times of screwing on and off repeated until the desired clamping torque (30000 Nm) was no more obtained due to deformation of the thread was counted. Where this number exceeds 150, the durability was judged good (O). Where the number is smaller than 150, the durability was judged poor (x). The number 150, taken as a criterion, is a standard number of times of uncapping and capping involved until the contents of the container for powder (Wide Hiter from Kao Corp.) is used up.

TABLE 2

|  | Example 3 | Example 4 | Compara. Example 2 | Compara. Example 3 |
|---|---|---|---|---|
| Natural Fiber (wt %) | 40 | 51 | 30 | 91 |
| Drop Strength | no cracks | no cracks | no cracks | no cracks |
| Vertical Compressive Strength (N) | 800 ○ | 800 ○ | 800 ○ | 600 ○ |
| Breaking Strength in Transverse Compression (N) | 300 ○ | 150 ○ | 500 x | 30 ○ |
| Overrun Torque (Nm) | 9400 ○ | 103000 ○ | 85000 ○ | 25000 x |
| Moisture Permeability (g/m$^2$ · 24 hr) | 0.05 ○ | 0.05 ○ | 0.05 ○ | 100 x |
| Durability (number of times) | 300 or more ○ | 300 or more ○ | 300 or more ○ | 50 x |
| Need of Separation for Disposal | needed | not needed | needed | not needed |

As shown in Table 2, the pulp molded containers of Examples 3 and 4 are equal or superior to those of Comparative Examples 2 and 3 in performance required for use as a container, such as drop strength, vertical compressive strength, shape precision, tight seal, and durability. Although the container of Example 3 needs to be taken apart for disposal similarly to that of Comparative Example 2, it has more ease of disposal than that of Comparative Example 2, i.e., it has been confirmed that the separating operation can be done with ease. It was also been ascertained that the container of Example 4 needs no separation and can be disposed of as such causing little environmental pollution.

Industrial Applicability

The present invention provides a waterproof and moistureproof pulp molded container which achieves waterproofness and moistureproofness with a smaller amount of raw material than conventionally required.

The present invention provides a waterproof and moistureproof pulp molded container of which the pulp fiber is highly disintegrable and easily recyclable.

The present invention provides a pulp molded container which exhibits high barrier properties against gas or liquid to assure excellent storage stability for the contents. In particular, blisters are effectively prevented from occurring between the molded article and resin layers by controlling the moisture permeability of the resin layers.

A resin layer exhibiting desired performance uniformly can be formed by rotating a pulp molded article having an undried resin layer on a prescribed axis until the undried resin layer gets tack-free.

Where a molded piece formed of natural fiber and a binder is attached to a pulp molded container, the container provides a tight seal on closure and durability withstanding repeated use and can be discarded as waste with the molded piece attached without causing environmental pollution. Where it is necessary to separate the molded piece from the container, the separating operation is easy. In particular, where the molded piece as formed has a tab to be torn off, it is given a paper-like appearance, making a user recognize that pulp fiber is employed.

What is claimed is:

1. A pulp molded container comprising a pulp molded article having on an inner surface and an outer surface thereof a resin layer with a thickness of 5 to 300 pm formed by applying a coating, wherein a thickness ratio of said resin layer to said molded article is 1/2 to 1/100, and a surface roughness profile of the outer surface or the inner surface of said pulp molded article is such that a centerline average roughness (Ra) is 0.5 to 20 μm, wherein said pulp molded article has said resin layer on both the inner surface and the outer surface thereof, the water vapor transmission rate of the resin layer formed on the inner surface and that of the resin layer formed on the outer surface differ by 10 g/(m².24 hr) or more, and either one of the resin layers has a water vapor transmission rate of 100 g/(m².24 hr) or less.

2. The pulp molded container according to claim 1, wherein said surface roughness profile of the outer surface or the inner surface of said pulp molded article is such that a maximum height ($R_{max}$) is 1 to 500 μm.

3. The pulp molded container according to claim 1, wherein said pulp molded article has a Cobb's water absorptiveness of 5 to 600 g/(m².2 min).

4. The pulp molded container according to claim 1, wherein said pulp molded article has a void of 30 to 70%.

5. The pulp molded container according to claim 1, wherein said pulp molded article has an opening portion, a body, and a bottom.

6. The pulp molded container according to claim 1, wherein said pulp molded article has an opening portion, a body, and a bottom with a corner in said body or between said body and said bottom, and the coating weight of said coating per unit area is larger on the surface of said corner than on the surface of said body.

7. The pulp molded container according to claim 1, which has on a part thereof a molded piece formed of a composition comprising 40 to 90% by weight of natural fiber and a binder.

8. The pulp molded container according to claim 1, which has on a part thereof a molded piece formed of a composition comprising more than 50 up to 90% by weight of natural fiber and a binder.

* * * * *